W. C. SMILEY.
ANTISKIDDING DEVICE.
APPLICATION FILED SEPT. 11, 1920.
1,385,282.
Patented July 19, 1921.
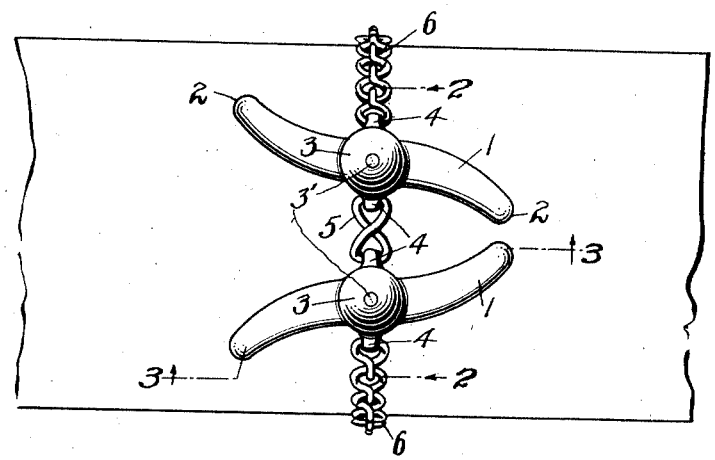
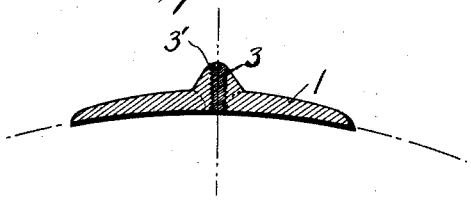
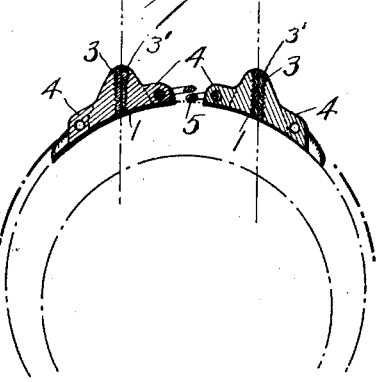
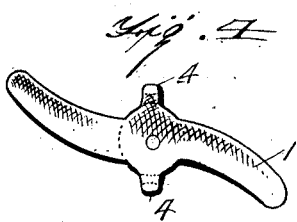
INVENTOR.
WILMONT C. SMILEY,
BY
Franklin H. Hough
ATTORNEY.

UNITED STATES PATENT OFFICE.

WILMONT C. SMILEY, OF WAMPUM, PENNSYLVANIA.

ANTISKIDDING DEVICE.

1,385,282.  Specification of Letters Patent.  Patented July 19, 1921.

Application filed September 11, 1920. Serial No. 409,703.

*To all whom it may concern:*

Be it known that I, WILMONT C. SMILEY, a citizen of the United States, residing at Wampum, in the county of Lawrence and State of Pennsylvania, have invented certain new and useful Improvements in Antiskidding Devices; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of my invention is to provide a novel construction of armor, adapted to be exteriorly applied to an automobile tire to prevent skidding of the wheels of the automobile; and the invention is designed to present a structure which will combine the maximum of efficiency in use with the minimum of cost in manufacture, and at the same time to provide a structure which is easily and quickly applied to the tire.

The invention in its preferred form is illustrated in the accompanying drawing, in which like reference characters designate corresponding parts throughout the several views. Briefly described:

Figure 1 is a fragmentary top plan view of a vehicle tire equipped with my improved armor;

Figs. 2 and 3 are sectional views along lines 2—2 and 3—3 respectively of Fig. 1, and Fig. 4 is a bottom plan view of one of the two complemental bars of the tire armor.

Referring now in detail to the drawing:

1, 1 designate two complemental bars which are peculiarly formed to present a maximum of efficiency. Each of the longitudinal marginal edges, or sides, of the bars is reversely curved, as shown; that is to say, is formed as a compound curve and the ends 2, 2 of each bar are round and beveled on their tops, as shown most clearly in Fig. 3. Each of the bars 1 is, as shown most clearly in Fig. 3, curved longitudinally so as to conform to the longitudinal curvature of the tire, and to fit flatly thereagainst. Also, as shown most clearly in Fig. 2, each of said bars is transversely curved, so as to conform to the transverse curvature of the tire.

Each of the bars 1 is provided, intermediate its ends, with a protuberance, or upwardly projecting knob 3, preferably cone-shaped, as shown clearly in Fig. 2. Each of said protuberances carries at diametrically opposite points, ears 4, 4, the adjacent ears of the two protuberances being engaged by a link 5, whereby the bars 1, 1 are held in suitable spaced relation. The other ears 4 of the protuberances 3 are connected with chain sections 6, 6, each of said chain sections being adapted to be passed transversely around opposite sides of the tire, and to be secured together at their free ends in any suitable way so as to clamp the tire armor firmly to the tire in use.

The arrangement of the two bars 1, 1 is such that two adjacent ends 2, 2 of the bars are much nearer together than the opposite ends, as shown clearly in Fig. 1.

The armor bars 1, 1 and the projections 3, 3 are, of course, constructed of metal, and preferably the projections 3, 3, carrying cores 3' of hardened metal, which may conveniently be screw threaded to engage correspondingly threaded recesses in the projections. Desirably, also, said cores and recesses in which they are inserted are tapering, as shown.

What I claim to be new is:

1. An anti-skidding attachment for vehicle tires comprising two bars, longitudinally and transversely curved, said bars being divergently positioned, each of said bars having, intermediate its ends, a protuberance, said bars being connected intermediate their ends by a link, and chain sections secured to said bars and adapted to pass transversely around the opposite sides of the tire, for securing the armor in position.

2. An anti-skidding attachment for vehicle tires, comprising two longitudinally and transversely curved bars, each of the longitudinal marginal edges of said bars being reversely curved, a link connecting said bars intermediate their ends, and a projection carried by each bar intermediate its ends.

3. An anti-skidding attachment for vehicle tires, comprising two longitudinally and transversely curved bars, each of the longitudinal marginal edges of said bars being reversely curved, a link connecting said bars intermediate their ends, and a projection carried by each bar intermediate its ends, said bars being held by said link connection divergently disposed.

4. An anti-skidding attachment for vehicle tires, comprising two longitudinally and transversely curved bars, each of the longitudinal marginal edges of said bars being reversely curved, a link connecting said bars intermediate their ends, and a projection carried by each bar intermediate its ends, each of said projections carrying a core of relatively harder material.

5. An anti-skidding attachment for vehicle tires, comprising two longitudinally and transversely curved bars, each of the longitudinal marginal edges of said bars being reversely curved, a link connecting said bars intermediate their ends, and a projection carried by each bar intermediate its ends, each of said projections carrying a screw threaded core screwed into a threaded aperture therein.

6. An anti-skidding attachment for vehicle tires, comprising two longitudinally and transversely curved bars, each of the longitudinal marginal edges of said bars being reversely curved, a link connecting said bars intermediate their ends, and holding said bars divergently disposed and a projection carried by each bar intermediate its ends, each of said projections carrying a tapering screw-threaded core of relatively harder metal engaging a threaded aperture therein.

In testimony whereof I hereunto affix my signature.

WILMONT C. SMILEY.